United States Patent
Harris (10) Patent No.: US 11,091,179 B2
(45) Date of Patent: Aug. 17, 2021

(54) RAIL CAR SIDE BEARING

(71) Applicant: Amsted Rail Company, Inc., Chicago, IL (US)

(72) Inventor: Zachary B. Harris, Edwardsville, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 330 days.

(21) Appl. No.: 16/178,232

(22) Filed: Nov. 1, 2018

(65) Prior Publication Data

US 2020/0139994 A1    May 7, 2020

(51) Int. Cl.

| | |
|---|---|
| *B61F 5/14* | (2006.01) |
| *B61F 5/12* | (2006.01) |
| *B61F 5/40* | (2006.01) |
| *B61F 5/24* | (2006.01) |
| *B60G 15/04* | (2006.01) |
| *B61F 5/26* | (2006.01) |

(52) U.S. Cl.
CPC .............. *B61F 5/14* (2013.01); *B61F 5/122* (2013.01); *B61F 5/24* (2013.01); *B61F 5/40* (2013.01); *B60G 15/04* (2013.01); *B61F 5/26* (2013.01)

(58) Field of Classification Search
CPC .. B61F 5/14; B61F 5/142; B61F 5/148; B61F 5/24; F16F 1/44; F16F 7/00; F16F 7/08
See application file for complete search history.

(56) References Cited

U.S. PATENT DOCUMENTS

| | | |
|---|---|---|
| 946,261 A | 1/1910 | O'Connor |
| 1,179,755 A | 4/1916 | Price |
| 1,193,313 A | 8/1916 | Townsend |
| 1,233,348 A | 7/1917 | Hansson |
| 1,252,358 A | 1/1918 | Miner |
| 1,290,319 A | 1/1919 | O'Connor |
| 1,722,668 A | 7/1929 | Lane |
| 1,808,839 A | 6/1931 | Davis |
| 2,197,783 A | 4/1940 | Barrows |

(Continued)

FOREIGN PATENT DOCUMENTS

| | | |
|---|---|---|
| WO | 2007096655 A1 | 8/2007 |
| WO | 2013090244 A1 | 6/2013 |

OTHER PUBLICATIONS

PCT Search Report and Written Opinion from International Application No. PCT/US2019/054619; dated Dec. 11, 2019; 11 pages.

(Continued)

*Primary Examiner* — Robert J McCarry, Jr.
(74) *Attorney, Agent, or Firm* — Fitch, Even, Tabin & Flannery LLP (57) ABSTRACT

In one aspect of the present disclosure, a side bearing is provided for supporting a body of a rail car. The side bearing includes a base for being mounted to a truck of the rail car, a support configured to contact the body of the rail car and move along a vertical axis relative to the base with movement of the body, and at least one resilient foam member configured to deform with movement of the support. The side bearing further includes at least one friction damping member configured to be urged in a direction transverse to the vertical axis against the base by the support and resist movement of the support relative to the base.

29 Claims, 10 Drawing Sheets

(56) References Cited

U.S. PATENT DOCUMENTS

| | | |
|---|---|---|
| 2,259,608 A | 10/1941 | Blattner |
| 2,285,140 A | 6/1942 | Barrows |
| 2,541,769 A | 2/1951 | Keysor |
| 2,571,190 A | 10/1951 | Blattner |
| 2,636,789 A | 4/1953 | Blattner |
| 2,830,857 A | 4/1958 | Blattner |
| 3,151,918 A | 10/1964 | Bachman |
| 3,401,991 A | 9/1968 | MacDonnell |
| 3,514,169 A | 5/1970 | MacDonnell |
| 3,600,047 A | 8/1971 | MacDonnell |
| 3,730,104 A | 5/1973 | Hood, II |
| 3,748,001 A | 7/1973 | Neumann |
| 3,762,338 A | 10/1973 | Dwyer |
| 3,762,339 A | 10/1973 | Dwyer |
| 3,897,737 A | 8/1975 | Davis |
| 4,130,066 A | 12/1978 | Mulcahy |
| 4,198,037 A | 4/1980 | Anderson |
| 4,434,720 A | 3/1984 | Mulcahy |
| 4,715,290 A | 12/1987 | Hood, II |
| 4,924,779 A | 5/1990 | Curtis |
| 5,046,866 A | 9/1991 | Mulcahy |
| 5,086,707 A | 2/1992 | Spencer |
| RE34,129 E | 11/1992 | Wright |
| 5,315,934 A | 5/1994 | List |
| 5,601,031 A | 2/1997 | Carlson |
| 5,806,435 A | 9/1998 | Pitchford |
| 6,092,470 A | 7/2000 | O'Donnell |
| 6,644,214 B1 | 11/2003 | Schorr |
| 6,792,871 B2 | 9/2004 | O'Donnell |
| 6,892,999 B2 | 5/2005 | Hall |
| 7,044,061 B2 | 5/2006 | O'Donnell |
| 7,121,212 B2 | 10/2006 | Schorr |
| 7,174,837 B2 | 2/2007 | Berg |
| 7,338,034 B2 | 3/2008 | Aspengren |
| 7,527,003 B1 | 5/2009 | Schorr |
| 7,527,131 B1 | 5/2009 | Wike |
| 7,546,807 B2 | 6/2009 | Johnstone |
| 7,549,379 B2 | 6/2009 | Monaco |
| 7,802,524 B1 | 9/2010 | Gregar |
| 8,136,457 B2 | 3/2012 | Sammartino |
| 8,201,504 B2 * | 6/2012 | O'Donnell .............. B61F 5/142 105/199.3 |
| 8,356,558 B2 | 1/2013 | Jeambey |
| 8,590,460 B2 | 11/2013 | Wike |
| 8,807,050 B2 | 8/2014 | Aspengen |
| 8,939,087 B2 | 1/2015 | McKisic |
| 8,967,052 B2 | 3/2015 | Aspengren |
| 9,555,818 B1 | 1/2017 | Wike |
| 2006/0117985 A1 | 6/2006 | Forbes |
| 2008/0173211 A1 | 7/2008 | Kennedy |
| 2009/0308276 A1 | 12/2009 | Aitken |
| 2012/0291660 A1 | 11/2012 | Aspengen |

OTHER PUBLICATIONS

U.S. Appl. No. 62/663,755, filed Apr. 27, 2018, Wike.
U.S. Appl. No. 16/391,558, filed Apr. 23, 2019; 31 pages.

* cited by examiner

RAIL CAR SIDE BEARING

FIELD

This disclosure relates to rail cars and, more specifically, to side bearings that limit the rolling movement of a body of a rail car.

BACKGROUND

A rail car, such a freight rail car, includes a car body that may carry bulk material or finished goods and a pair of trucks having wheelsets with tapered wheels that travel along rails of a railroad track. The car body has a center sill that extends under the car body and coupling systems at opposite ends of the center sill to attach the rail car to adjoining rail cars. The rail car body further includes a pair of bolsters that extend across the rail car body and intersect the center sill.

The rail car has a center plate at each bolster and each truck has a bolster with a center bowl. During assembly of the rail car, the rail car body is lowered onto the trucks so that the center plates of the body are received in the center bowls of the trucks. Each truck has a pair of side bearings on the bolster thereof that contact one of the bolsters of the rail car body as the rail car body is lowered onto the trucks. The weight of the rail car body compresses the side bearings to a static or setup configuration.

During operation of the rail car, the rail car body vertical load is transferred from the rail car body center plates to the truck center bowls. The trucks may turn relative to the rail car body as the rail car goes around curves in the track such that the center plates and truck center bowls turn relative to each other.

The side bearings are outboard of the truck center bowls and limit side-to-side rail car body roll and keep the rail car from overturning. Some side bearings are constant contact side bearings wherein each side bearing is in contact with the rail car body throughout the range of motion of the rail car body. Conventional constant contact side bearings utilize compression springs mounted to the truck bolsters to dampen the roll load of the rail car body.

The center of gravity of the rail car body encompasses the weight of the car body and the lading therein. As the rail car travels down the track, track perturbations are transmitted into the rail car and cause displacement of the center of gravity of the rail car body. The displacement of the center of gravity creates body roll that changes the distribution of the weight of the rail car on the wheelsets and changes the balance of forces through the wheelsets to the rails. The change in the balance of forces causes a hunting event, wherein the tapered wheels move laterally on the rails to find a new location on the rail where wheel forces are balanced. Hunting events create instability in the rail car that limits speed and increases wear of the components of the rail car.

Conventional constant contact rail car side bearings create inherent instabilities that have always been present but were not prominent until recent increases in rail car capacities and operating speeds as well as more stringent safety standards. More specifically, as the rail car body rolls in one direction, the kinetic energy is temporarily stored as potential energy in the spring of one of the constant contact side bearings. Once the rail car body reaches the end of its travel at the one side bearing, the rail car body then rolls in a second, opposite direction toward the other side bearing. The spring of the one constant contact side bearing rebounds as the rail car body rolls in the second direction and releases the stored potential energy which pushes the rail car body in the second direction. Although the constant contact side bearings dampen the side-to-side rolling movement of the rail car body, the spring of each of the side bearings introduces energy into the rail car body as the rail car body rolls back toward the other side bearing. The addition of energy to the rolling rail car body may prolong hunting events and promote instability of the rail car.

SUMMARY

In accordance with one aspect of the present disclosure, a side bearing is provided for supporting a body of a rail car. The side bearing includes a base for being mounted to a truck of the rail car and a support configured to contact the body of the rail car and move along a vertical axis relative to the base with movement of the body. The side bearing includes at least one resilient foam member configured to deform with movement of the support and at least one friction damping member configured to be urged in a direction transverse to the vertical axis against the base by the support and resist movement of the support relative to the base. The at least one resilient foam member absorbs rolling energy of the rail car body and has a hysteresis that dampens acceleration of the rail car body. The at least one friction damping member provides friction damping in addition to the hysteresis damping provided by the at least one resilient foam member to further dampen acceleration of the rail car body. The damping provided by the at least one resilient foam member and the at least one damping member keeps the rail car body acceleration within designated safety limits during empty hunting and loaded hunting events, which in turn permits higher travel speeds with heavier loads.

The hysteresis of the at least one resilient foam member dissipates energy as the structure of the at least one resilient foam member is deformed and as the resilient foam member is restored to an original shape thereof. Further, the hysteresis of the at least one resilient foam member limits the upward restoring force the at least one resilient foam member applies against the support as the rail car body rolls away from the side bearing and the at least one resilient foam member expands from a compressed height. By limiting the upward restoring force the side bearing applies to the rail car body, the rail car body may roll at a slower velocity which helps stabilize the rail car on the tracks. The at least one resilient foam member thereby applies less energy to the rail car body and dampens rolling of the rail car body during empty hunting and loaded hunting events. The at least one resilient foam member may include, for example, microcellular urethane. In one embodiment, the at least one resilient foam member includes a pair of resilient foam members.

In one embodiment, each resilient foam member has a free or uncompressed height and has a fully compressed height in the range of sixty percent to eighty percent, such as approximately seventy percent, of the uncompressed height. Despite the relatively large deformation, the stress within the resilient foam member stays within an allowable range. As an example, the resilient foam member may be configured to provide approximately 1.5 inches of travel of the rail car body support. The approximately 1.5 inches of travel includes approximately 0.5 inches below the setup height of the side bearing and approximately one inch above the setup height. The travel below the setup height permits the resilient foam member to absorb energy from the rail car body as the rail car body rolls toward the side bearing and the travel above the setup height keeps the support in contact with the rail car body as the rail car body rolls away from the side bearing. The side bearings may thereby remain in constant contact with the rail car body throughout the range of rolling motion of the rail car body.

In accordance with another aspect, a rail car is provided that includes a rail car body and a pair of trucks supporting the rail car body. Each truck has a pair of side bearings on opposite sides of the rail car body. Each side bearing includes a base and a support configured to contact the rail car body and move along a vertical axis relative to the base with movement of the rail car body relative to the truck. Each side bearing also includes at least one resilient foam member arranged to deform with movement of the support and at least one friction damping member configured to be urged in a direction transverse to the vertical axis against the base by the support and resist movement of the support relative to the base.

The resilient foam members of the side bearings absorb energy from the rail car body as the rail car body rolls back and forth during hunting events. Further, the internal hysteresis of the resilient foam members and the frictional damping provided by the friction damping members dampen rolling energy of the rail car body and keep rail car body acceleration levels within predetermined safety limits during hunting events.

A side bearing is also provided for supporting a body of a rail car. The side bearing includes a base for being mounted to a truck of the rail car and a compartment of the base. The side bearing has at least one resilient member in the compartment and a pair of side wall portions of the compartment. The at least one resilient member may be, for example, a resilient foam pad or a metallic helical spring. The side bearing further includes a cap assembly supported on the at least one resilient member and configured to move relative to the base with movement of the body of the rail car. The cap assembly has a pair of friction damping members facing the wall portions of the compartment of the base. The cap assembly further includes a cap having an upper surface for contacting the body of the rail car and at least one lower surface configured to contact the friction damping members and urge the friction damping members in opposite directions against the wall portions of the compartment to dampen movement of the cap assembly. By urging the friction damping members in opposite directions against the wall portions of the compartment, the friction damping members provide balanced damping of the cap assembly. Balanced damping lessens the risk of the side bearing binding during use and associated safety issues such as hunting.

DETAILED DESCRIPTION

Figure 1:
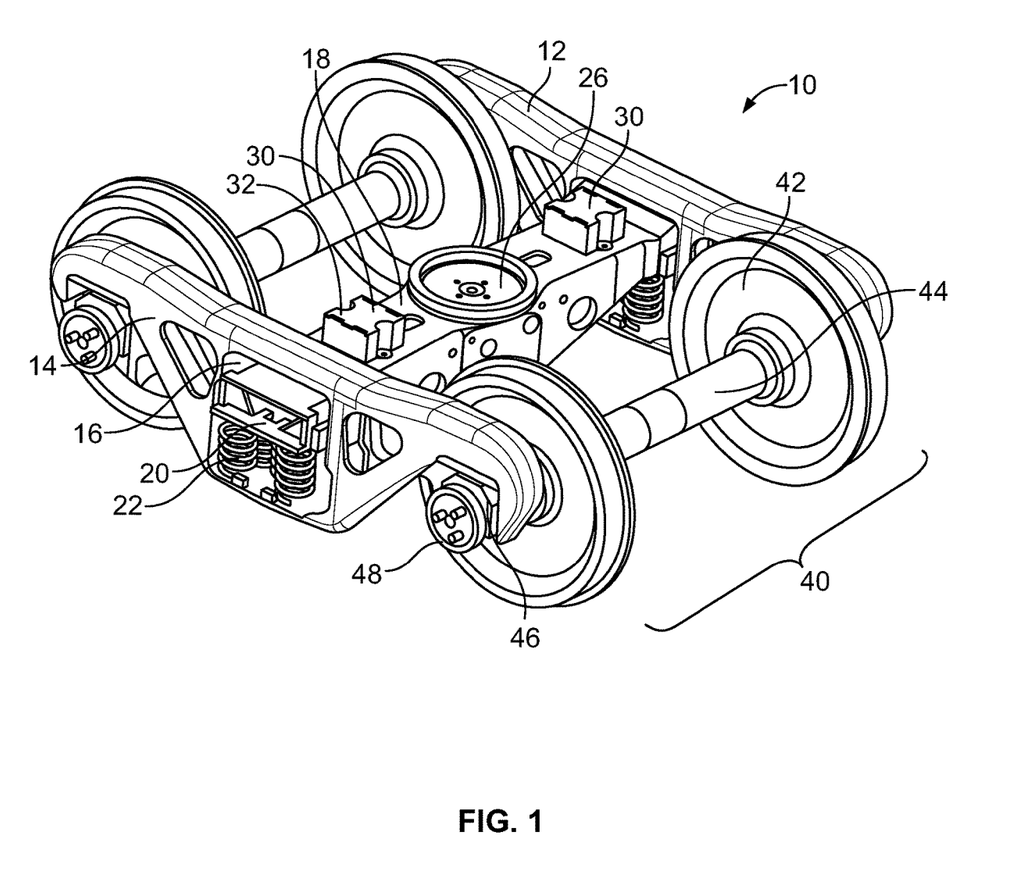
FIG. 1 is a perspective view of a rail car truck including a bolster with a center bowl and side bearings on opposite sides of the center bowl.
Figure 7:
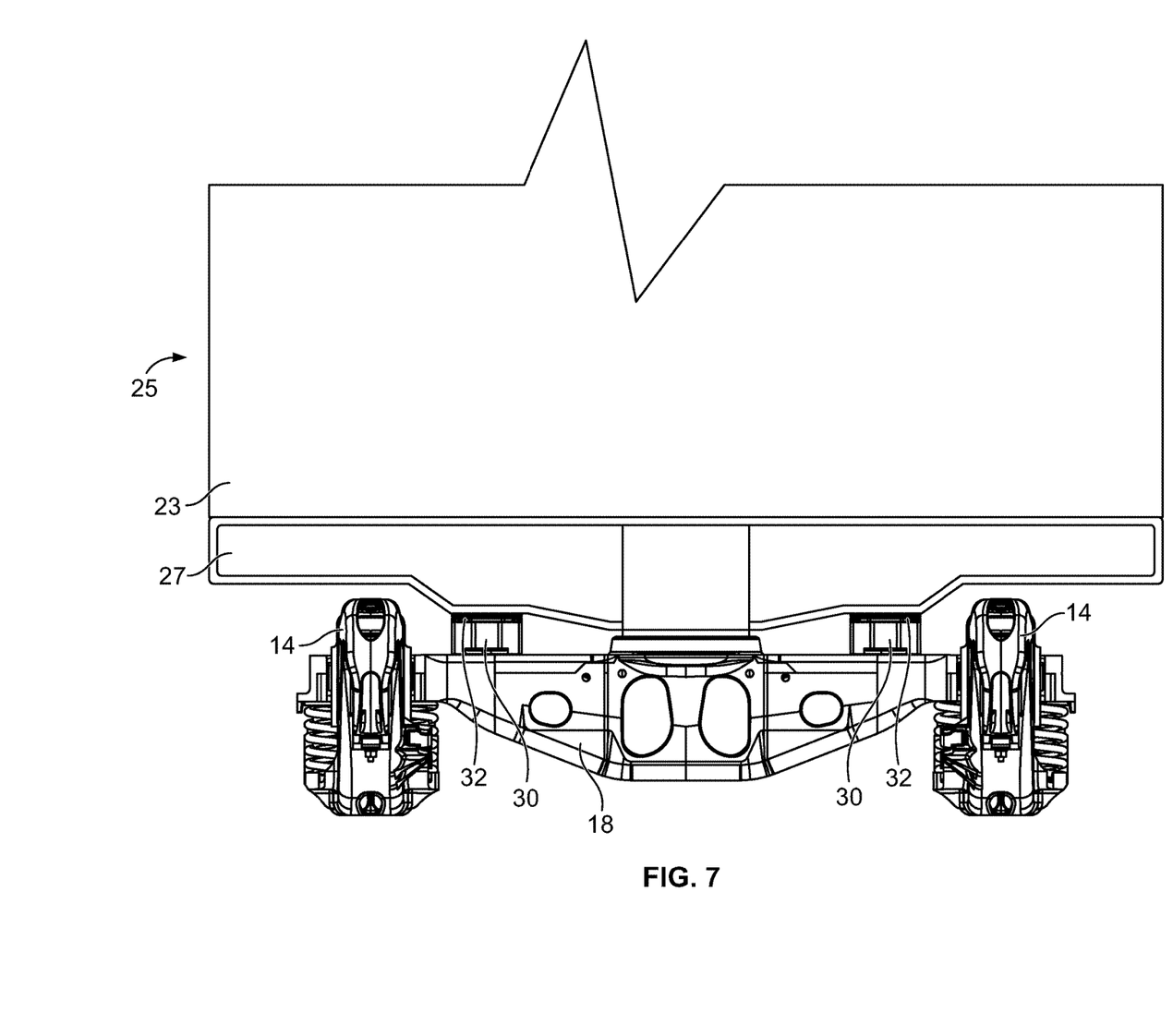
FIG. 7 is an end elevational view of a rail car including the truck of FIG. 1 with the wheelsets removed for clarity, FIG. 7 showing the side bearings contacting a bolster of the body of the rail car.

With reference to FIGS. 1 and 7, a rail car truck 10 is provided that includes a bolster 18 and a pair of spaced apart side frames 12, 14 having openings 16 through which the bolster 18 extends. The bolster 18 has end portions 20 extending through the side frame openings 16 that are supported by springs 22. The bolster 18 includes a center bowl 26 for receiving one of the center plates of a body 23 of a rail car 25. The rail car truck 10 includes a pair of side bearings 30 having rail car body supports, such as caps 32, configured to contact a bolster 27 of the rail car body 23 and limit rolling back-and-forth movement of the rail car body 23 as the rail car 25 travels along a track. The caps 32 undergo vertical reciprocating movement as the rail car body 23 rocks back-and-forth and remain in constant contact with the rail car body 23 to slow movement of the rail car body 23. The rail car truck 10 includes one or more wheel sets 40 that each include a pair of wheels 42 on an axle 44. The rail car truck 10 further includes bearing adapters 46 mounted to the side frames 12, 14 that receive bearings 48 mounted to journals of the axle 44.

Figure 2:
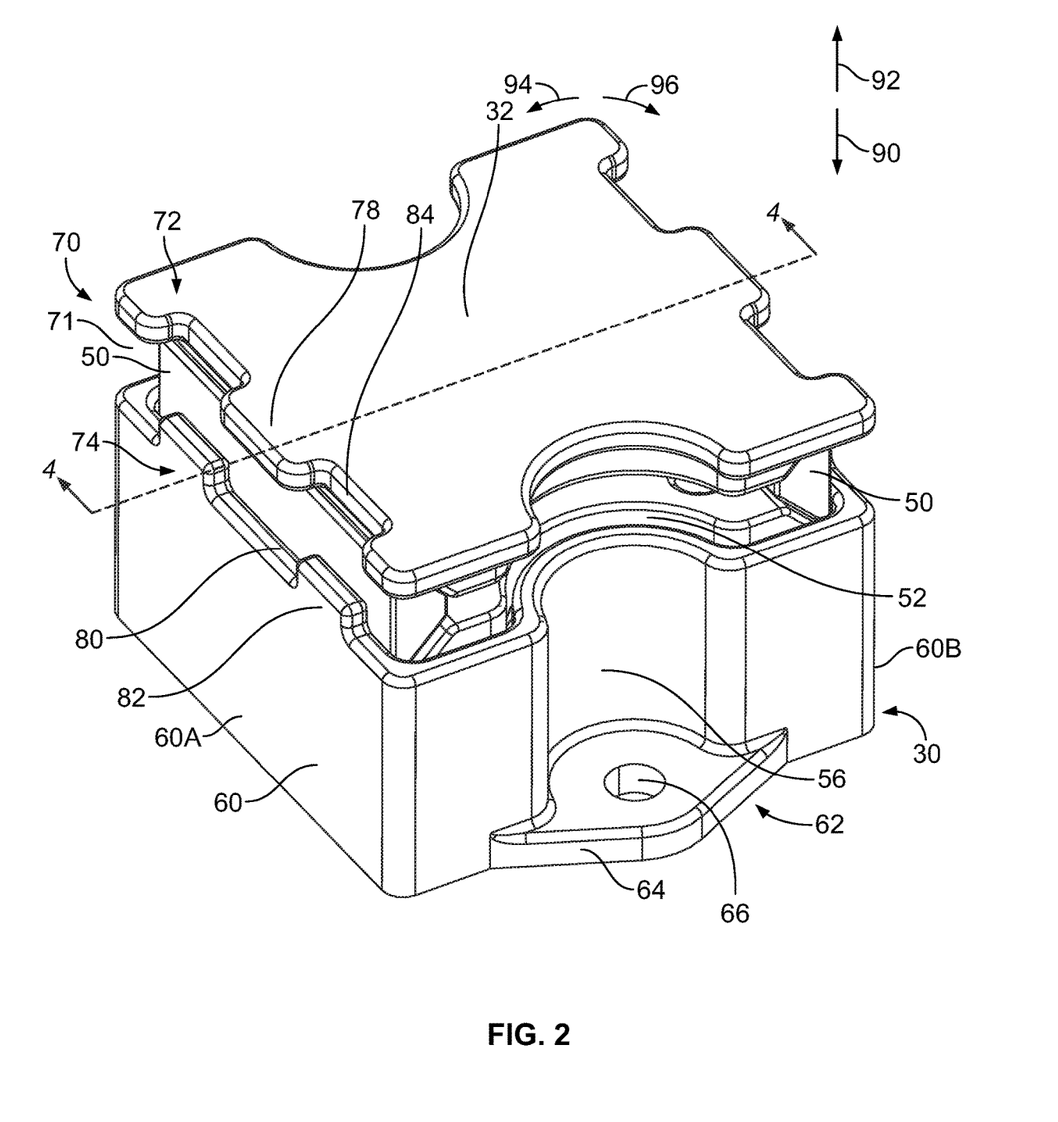
FIG. 2 is a perspective view of one of the side bearings of FIG. 1 showing a cap of the side bearing supported above a base of the side bearing.
Figure 3:
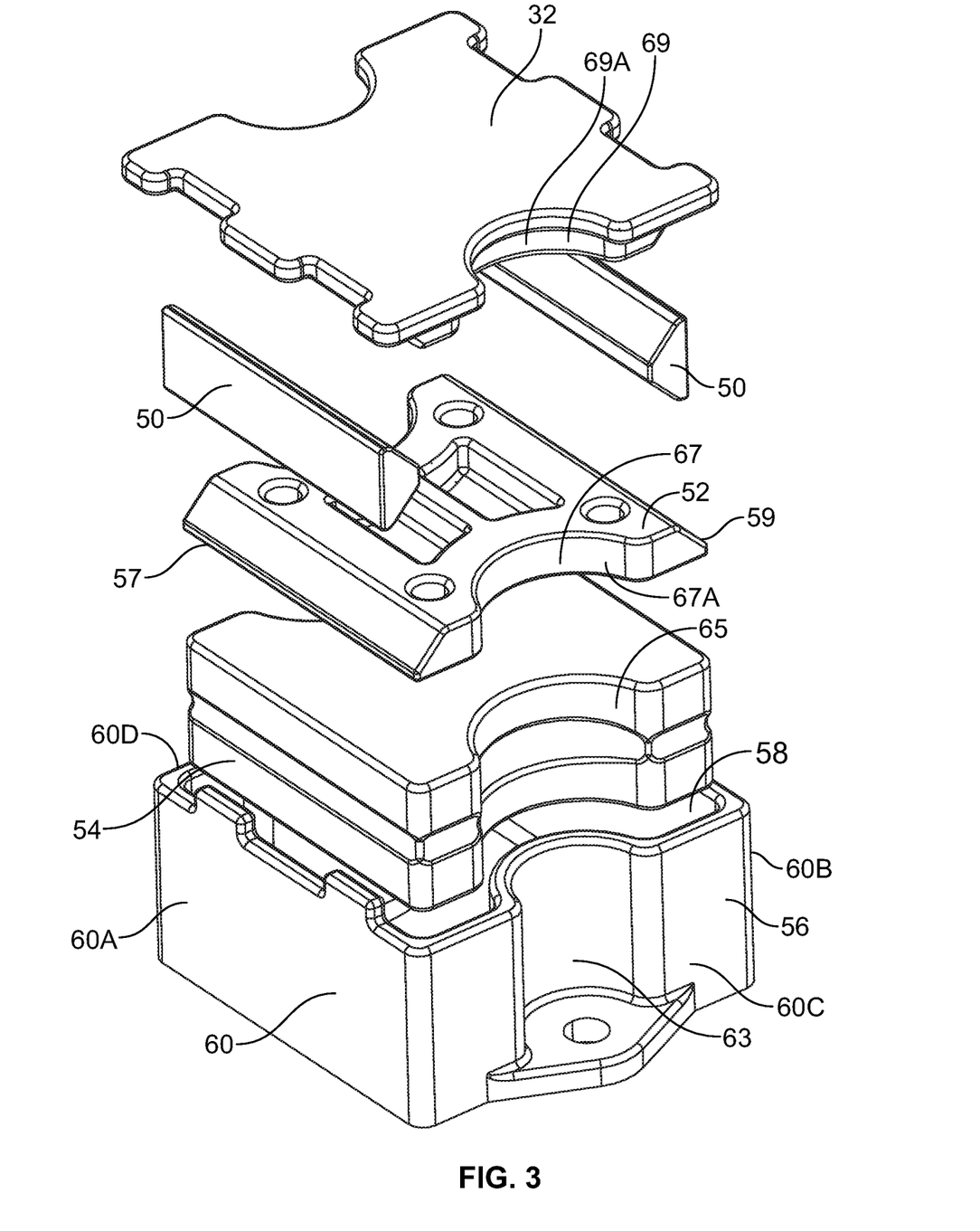
FIG. 3 is an exploded view of the side bearing of FIG. 2 showing a resilient foam pad that is received in the base, a wedge support that is positioned on the resilient foam pad, and a pair of wedges that are captured between the cap and the wedge support.

With reference to FIGS. 2 and 3, each side bearing 30 includes a base 56 having a compartment 58 that receives an elastomeric member, such as a resilient foam. In one embodiment, the resilient foam member is a resilient foam pad 54. As an example, the resilient foam pad 54 may be made of microcellular urethane. The resilient foam pad 54 deforms to absorb roll energy from the rail car body 25 as the rail car body 25 rolls toward the side bearing 30 and moves the cap 32 in direction 90. The side bearing 30 further includes one or more friction damping members, such as wedges 50, and a damping body, such as a wedge support 52. The wedges 50 frictionally engage the base 56 and dampen movement of the cap 32 in directions 90, 92 (see FIG. 4). The wedges 50 and wedge support 52 are at least partially in the compartment 58 between the cap 32 and a floor 62 of the base 56. The base 56 includes one or more side walls 60 upstanding from the floor 62. In one embodiment, the side walls 60 form a generally polygonal cross-section of the compartment 58 taken normal to a vertical axis 110 (see FIG. 4) of the side bearing 30. The side walls 60 may form a generally rectangular cross-section of the compartment 58 and the wedge support 52 has a generally rectangular shape including a pair of straight sides 57, 59 (see FIG. 3) facing straight side walls 60A, 60B of the base 56. The wedges 50 are also straight and are held in contact with the straight side walls 60A, 60B by the straight sides 57, 59 of the wedge support 52. As used herein, the term vertical axis 110 is used herein in reference to the axis along which the cap 32 reciprocates during operation of the rail car 25. For example, the base 56 may be installed on an inclined surface of the truck bolster 18 such that the vertical axis 110 is not vertical with respect to the ground. Further, the term horizontal is used to indicate a direction transverse to the vertical axis 110.

The side bearing includes a cap assembly including the cap 32, wedges 50, and wedge support 52. The cap 32, wedge support 52, and the base 56 including mating portions that limit movement of the cap 32 and wedge support 52 to vertical reciprocal movement. These mating portions help the side bearing 30 resist frictional loading from the rail car bolster 27 as the truck 10 turns relative to the rail car body 23. For example, the base 56 may include one or more side walls 60C, 60D with portions that key the wedge support 52 and the cap 32 relative to the base 56 and limit movement of the wedge support 52 and the cap 32 to vertical, reciprocal movement. In one embodiment, the portions of the side walls 60C, 60D include a protrusion 63 (see FIG. 3) that extends into recesses 65, 67, 69 of the resilient foam pad 54, the wedge support 52, and the cap 32. The wedge support 52 and the cap 32 have walls 67A, 67C on opposite sides thereof configured to mate with the protrusions 63. This mating engagement limits turning of the wedge support 52, wedges 50, and cap 32 in directions 94, 96 (see FIG. 2) about the vertical axis 110.

The assembly of the cap 32, wedges 50, wedge support 52, and resilient foam pad 54 operate to dampen the movement of the cap 32 as the cap 32 is shifted in downward in direction 90 as the rail car body 23 rolls toward the side bearing 30 such as when the rail car goes around a turn or during a hunting event. Conversely, the assembly of the cap 32, wedges 50, wedge support 52, and resilient foam pad 54 operate to dampen movement of the cap 32 as the cap 32 shifts upward in direction 92 as the rail car body 23 rolls away from the side bearing 30 and toward the other side bearing 30. In this manner, the side bearing 30 may remove energy from the rail car body 23 as the rail car body 23 rolls back and forth during a hunting event.

The base 56 includes a mounting portion 62 that may include, for example, one or more flanges 64 with one or more openings 66 to receive fasteners for securing the side bearing 30 to the bolster 18 as shown in FIG. 2. The openings 66 are generally aligned along the longitudinal direction of the railcar 25 when the side bearing 30 is installed on the truck bolster 18. In other embodiments, the base 56 may be welded to the bolster 18 or the base 56 may have a unitary, one-piece construction with the bolster 18 as a few examples.

In one embodiment, the resilient foam pad 54 includes a matrix of elastomeric material forming a plurality of air pockets. The matrix of elastomeric material may have a random or an ordered orientation within the resilient foam pad 54 and the air pockets may have varying or similar sizes. A large percentage of the volume of the resilient foam pad 54 is air, such as in the range of approximately 30 percent to approximately 50 percent, such as approximately 40 percent. As the resilient foam pad 54 is compressed, the air pockets compress. The resilient foam pad 54 may have an open cell configuration such that air exits the air pockets as the resilient foam pad 54 is compressed. As the resilient foam pad 54 decompresses, air enters back into the air pockets. In another embodiment, the resilient foam pad 54 may utilize a closed cell configuration.

The internal structure of the matrix material of the resilient foam pad 54 provides hysteresis damping as the resilient foam pad 54 is compressed from an initial shape and restored back to the initial shape. The hysteresis damping involves dissipating energy as the structure of the resilient foam pad 54 deforms from an initial configuration to a compressed configuration as well as returns from the compressed configuration to the initial configuration. The internal hysteresis damping provided by the resilient foam pad 54 limits spring-back of the resilient foam pad 54 and limits the energy the resilient foam pad 54 imparts to the rail car body as the resilient foam pad 54 returns from a compressed configuration (see, e.g., FIG. 6) to a less compressed configuration (see, e.g., FIG. 5). The resilient foam pad 54 imparts a restoring force that is slightly greater than or approximately equal to the weight of the assembly of the cap 32, wedges 50, and wedge support 52. The restoring force is enough to keep the cap 32 in contact with the rail car body 23 but not enough to significantly affect the motion of the rail car body 23. In one embodiment, the side bearing 30 does not include a coil spring such that compressing the side bearing 30 does not involve compressing a coil spring.

While the resilient foam pad 54 is resilient and deforms during use, the cap 32, wedges 50, wedge support 52, and base 56 are rigid. By rigid, it is intended that the components do not significantly deform during normal rail car operation. The cap 32, wedges 50, and wedge support 52, and base 56 may be made of one or more metallic materials. For example, the cap 32, wedge support 52, and base 56 may be made of steel and the wedges 50 may be made of iron, such as a tempered high-grade iron.

With reference to FIG. 2, each side bearing 30 includes a hard stop 70 that limits the travel of the cap 32 to a predetermined distance and inhibits over-compression of the resilient foam pad 54. The hard stops 70 of the side bearings 30 together define the maximum range of rolling motion of the rail car body 23. The side bearing 30 has a gap 71 between the cap 32 and the side walls 60 when the side bearing 30 is in an uncompressed configuration and the cap 32 is at a free height thereof. As the side bearing 30 is compressed, the cap 32 shifts toward the side walls 60 and the gap 71 narrows until the cap 32 contacts the side walls 60.

Figure 4:
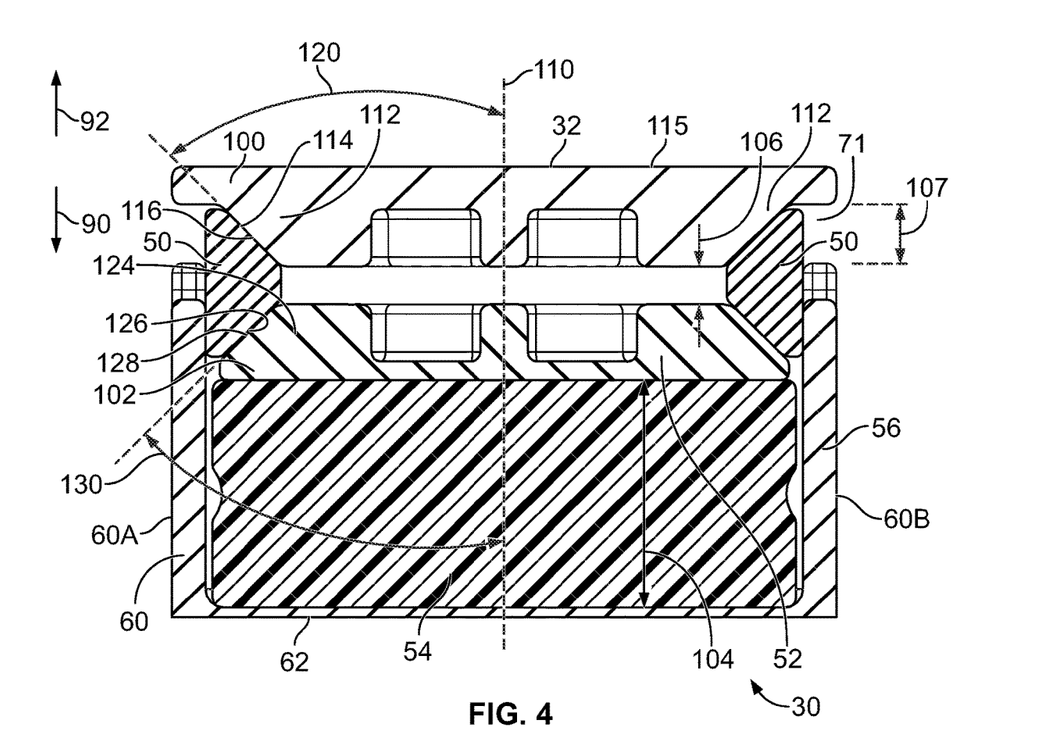
FIG. 4 is a cross-sectional view taken across line 4-4 in FIG. 2 showing the side bearing in a free or uncompressed configuration.

In one example, the hard stop 70 includes crenulated portions 72 of the cap 32 on opposite sides of the cap 32 and crenulated portions 74 of side walls 60A, 60B. The crenulated portions 72 include protrusions 78 that are vertically aligned with recesses 80 of the side walls 60. Conversely, the crenulated portions 74 of the side walls 60A, 60B include protrusions 82 that are aligned with recesses 84 of the cap 32. With reference to FIG. 4, the protrusions 82 have a vertical extent sized so that the upper ends of the protrusions 82 are above a center of gravity of each of the wedges 50 when the side bearing 30 is in the uncompressed configuration. This keeps the wedges 50 from falling out of the side bearing 30 when the side bearing 30 is in the uncompressed configuration. As the rail car body 25 applies a downward force against the cap 32, the protrusions 82 guides the wedges 50 as they shift downwardly and keep the wedges 50 from rolling outside of the envelope of the base 56.

With reference to FIGS. 3 and 4, the wedges 50 are each sandwiched between a horizontally outer portion 100 of the cap 32 and a horizontally outer portion 102 of the wedge support 52. The weight of the cap 32 holds the cap 32 in position on the wedges 50 which are in turn supported by the wedge support 52 and the resilient foam pad 54. In FIG. 4, the side bearing 30 is shown in a free or uncompressed configuration, before the rail car body 23 is lowered onto the truck 10. The resilient foam pad 54 includes an uncompressed height 104 and there is an initial distance 106 between the cap 32 and the wedge support 52. In the uncompressed configuration, the side bearing 30 has a distance 107 between the protrusions 78 of the cap 32 and the side walls 60 therebelow.

Figure 5:
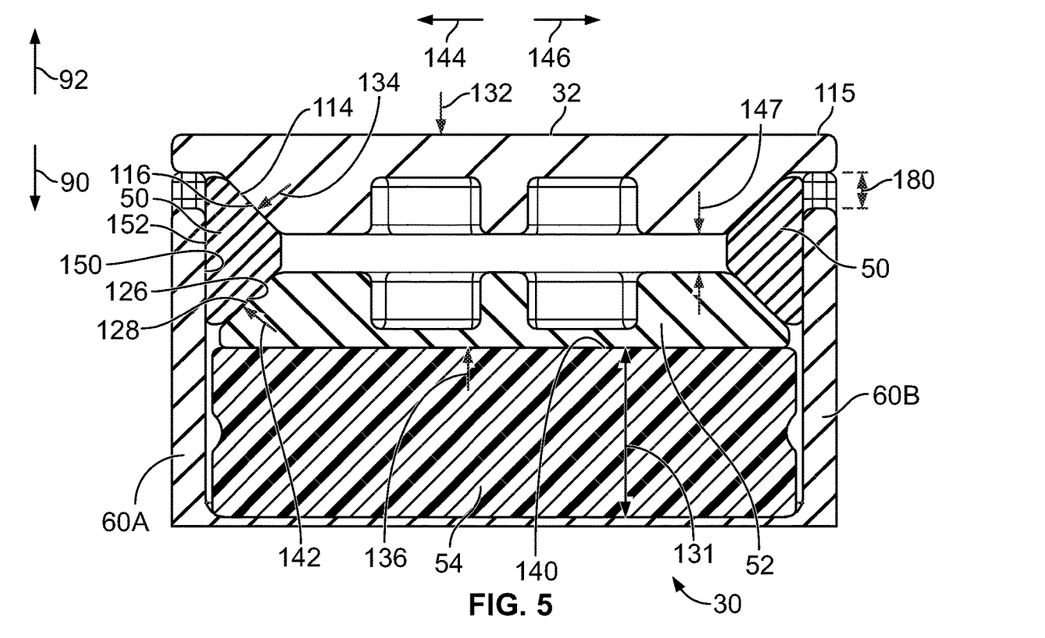
FIG. 5 is a cross-sectional view similar to FIG. 4 showing the side bearing in a setup configuration with the weight of the rail car body pressing the cap downward, the resilient foam pad partially compressed, and the cap and wedge support urging the wedges horizontally outward into engagement with side walls of the base.

With reference to FIG. 5, the side bearing 30 is shown in a setup configuration. The setup configuration occurs once the rail car body 23 has been positioned on the rail car truck 10 and the bolster 27 (see FIG. 7) of the rail car body 23 applies a force in direction 132 against an upper surface 115 of the cap 32 and urges the cap 32 downwardly in direction 90. The setup configuration is generally the static configuration of the side bearing 30 when the rail car 25 is at rest on tangent track. Shims may be positioned below the floor 62 of the base 56 to provide an accurate setup height for each of the side bearings 30 as required for a particular application.

As the rail car 25 travels down a track, the cap 32 travels in direction 90 along the vertical axis 110 of the side bearing 30 as the rail car body 23 rolls toward the side bearing 30 and in direction 92 as the rail car body 23 rocks away from the side bearing 30. The cap 32 includes cam portions 112 on opposite sides thereof and inclined surfaces 114 of the cam portions 112 that are engaged with upper inclined surfaces 116 of the wedges 50. In one embodiment, the inclined surfaces 114, 116 both extend at an angle 120 relative to the vertical axis 110. In other embodiments, the inclined surfaces 114, 116 may have different angles 120 relative to the vertical axis 110. Similarly, the wedge support 52 includes cam portions 124 on opposite sides thereof having inclined surfaces 126 that engage lower inclined surfaces 128 of the wedges 50. The inclined surfaces 126, 128 extend at an angle 130 relative to the vertical axis 110. In other embodiments, the inclined surfaces 126, 128 may extend at different angles 130 relative to the vertical axis 110. Further, the angles 120, 130 may be the same or different as required for a particular application. The angles 120, 130 may each be in the range of approximately 32 degrees to approximately 45 degrees.

The following discussion refers to forces acting on one of the wedges 50, but it will be appreciated that similar forces are acting on the other of the wedges 50 such that both wedges 50 operate in a similar manner. In the setup configuration of FIG. 5, the resilient foam pad 54 has a setup height 131 that is less than the uncompressed height 104. With the rail car body 23 applying a compressive force in direction 132 against the cap upper surface 115, the inclined surface 114 of the cap 32 transfers the force in direction 134 against the upper inclined surface 116 of the wedge 50. Concurrently, the now-compressed resilient foam pad 54 applies a reactionary force in direction 136 against a lower surface 140 of the wedge support 52. The reactionary force in direction 136 may be, for example, 6,000 lbs of force. The inclined surface 126 of the wedge support 52 transfers the force in direction 142 against the lower inclined surface 128 of the wedge 50. The forces acting in directions 134, 142 contain a horizontal component that urges the wedges 50 horizontally outward and apart from each other in directions 144, 146. The frictional engagement between the wedges 50 and the side walls 60A, 60B creates drag which resists movement of the cap 32 in direction 90.

The clamping of the wedges 50 between the cap 32 and the wedge support 52 as the rail car body 23 applies the compressive force in direction 132 engages the surfaces 114, 116 and 126, 128 and firmly presses outer surfaces 150 of the wedges 50 against one or more inner surfaces 152 of the side walls 60. The side walls 60 have wall portions that include the inner surfaces 152. The wedges 50 may also be clamped between the cap 32 and the wedge support 52 when the rail car 25 goes around a constant curve and the roll angle of the rail car body 23 remains fixed. In this situation, the cap 32 and the wedge support 52 continue to clamp the wedges 50 therebetween and urge the wedges 50 outwardly despite the assembly of the cap 32, wedges 50, and wedge support 52 remaining stationary. The clamping is caused by the weight of the rail car body 23 acting in direction 132 and the reactionary force of the resilient foam pad 54 acting in direction 136.

The outer surfaces 150 of the wedges 50 and the inner surfaces 152 of the side walls 60 may be substantially flat, vertical surfaces that allow translation up and down of the wedges 50 without an angular component of force that could cause the wedges 50 to bite into the side walls 60. Rather, the cap 32 and wedge support 52 urge each of the wedges 50 in a direction normal to the inner surface 152 of the associated side wall 60. This improves the durability of the side bearing 30.

The materials of the wedges 50 and the base 56 may be selected to provide the desired kinetic frictional coefficient between the components, such as in the range of approximately 0.4 to 0.65. Additionally, friction modifiers such as bumps or coatings may be provided on one or more of the outer wedge surface 150 and the inner side wall surface 152 to adjust the coefficient of friction between the surfaces.

The clamping of the wedges 50 between the cap 32 and the wedge support 52 and corresponding outward urging of the wedges 50 may, in some embodiments, cause the cap 32 and wedge support 52 to have a distance 147 therebetween that is less than the distance 106 therebetween when the side bearing 30 was in the uncompressed configuration. In other embodiments, the wedges 50 do not shift horizontally a noticeable distance such that the distance 106 effectively remains the same whether the side bearing 30 is uncompressed or compressed.

The side bearing 30 also has enhanced durability because the friction braking mechanism including the wedges 50 is wear-resistant. More specifically, the clamping of the cap 32 and wedge support 52 onto the wedges 50 and the corresponding horizontally urging of the wedges 50 may cause the wedge surfaces 150 to wear. But as the wedge surfaces 150 wear, the cap 32 and the wedge support 52 may draw together decreasing the distance 147 over time. However, the cap 32 and wedge support 52 continue to apply a camming action against the wedges 50 which maintains the wedges 50 engaged with the side walls 60 of the base 56. The side bearing 30 may include a visual indicator that permits a maintenance worker to visually observe that the wedges 50 have worn down beyond a predetermined amount such as the cap 32 sitting below a predetermined height when the side bearing 30 is in the setup configuration thereof.

Figure 6:
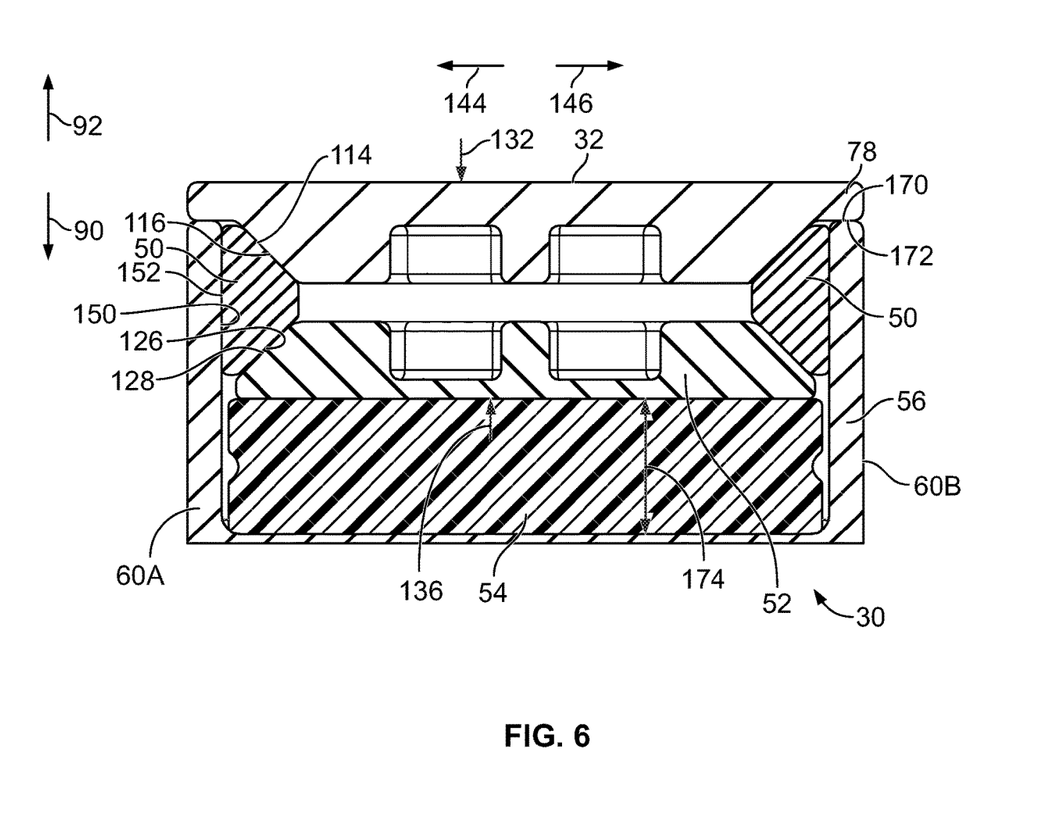
FIG. 6 is a cross-sectional view similar to FIG. 5 showing the side bearing in a fully compressed configuration with the cap contacting side walls of the base.

With reference to FIG. 6, the side bearing 30 is in a fully compressed configuration. The force in direction 132 from the rail car body 23 has pressed the cap 32 downward in direction 90 until lower surfaces 170 of the cap protrusions 78 contact upper surfaces 172 of the side walls 60A, 60B. The hard stop 70 formed between the cap 32 and the side walls 60A, 60B limits how far in direction 90 the rail car body 23 can shift the cap 32 and how far the wedge support 52 can compress the resilient foam pad 54. In the fully compressed configuration of the side bearing 30, the resilient foam pad 54 has a fully compressed height 174 that is less than the setup height 131. In one embodiment, the fully compressed height 174 is seventy percent of the uncompressed height 104. The difference between the uncompressed height 104 and the compressed height 174 may be, for example, 1.5 inches. When the side bearing 30 is in the fully compressed configuration, the resilient foam pad 54 may apply a reactionary force in direction 136 of, for example, 10,000 lbs of force. The changing reactionary force from the resilient foam pad 54 contributes to varying forces acting on the wedges 50 and varying drag forces the wedges 50 impart to the cap 32 as the cap 32 moves.

When the side bearing 30 is in the setup configuration of FIG. 5, the cap 32 may travel a distance 180, such as 0.5 inches, in direction 90 before encountering the hard stop 70 in direction 90. This closes the gap 71 (see FIG. 2). Conversely, the cap 32 may travel in upward in direction 92 a distance, such as approximately one inch, from the setup configuration to the uncompressed configuration position (see FIG. 4) until the hard stop 70 of the other side bearing 30 engages and limits further rolling movement of the rail car body 23. The ability of the cap 32 to travel upward in direction 92 for an inch keeps the cap 32 engaged with the rail car body 23 as the rail car body 23 rocks away from the side bearing 30. By keeping the cap 32 engaged with the rail car body 23 throughout the range of motion of the rail car body 23, the resilient foam pad 54 may immediately begin to absorb energy from the rail car body 23 as the rail car body 23 rocks back toward the side bearing 30 without the rail car body 23 lifting off of and then contacting the cap 32. This helps stabilize the rail car body and reduces hunting as the rail car 25 travels down the track.

With reference to FIGS. 5 and 6, as the rail car body rocks away from the side bearing 30, the cap 32, wedges 50, and wedge support 52 shift upward in direction 92 relative to the base. The resilient foam pad 54 applies a restoring force in direction 92 which keeps the cap 32 contacting the rail car body 23.

As the rail car body 23 rocks away from the side bearing 30, the cap 32, wedges 50, and wedge support 52 shift upwardly in direction 92 due to the removal of some of the weight of the rail car body 23 from the cap 32. However, the rail car body 23 still applies a load in direction 132 even as the rail car body 23 rocks away from the side bearing 30. The force applied in direction 132 produces a reactionary force in direction 136 from the resilient foam pad 54 and urges the wedges 50 horizontally outward in directions 144 and 146 via the engagement between the inclined surfaces 114, 116, and 126, 128. This tightly presses the outer surfaces 150 of the wedges 50 against the inner surfaces 152 of the side walls 60A, 60B. The frictional engagement between the wedges 50 and the side walls 60A, 60B creates drag which dampens and resists movement of the cap 32 in direction 92. Thus, the wedges 50 dampens movement of the cap 32 when the cap 32 moves in direction 90 as well as when the cap 32 moves in direction 92.

Due to the internal hysteresis of the resilient foam pad 54, the force the resilient foam pad 54 applies in direction 136 as the rail car body 23 rolls away from the side bearing 30 is much lower than a conventional metallic coil spring due to the internal hysteresis of the resilient foam pad 54. Whereas a conventional metallic coil spring would provide a restoring force with roughly the same magnitude of force the spring received, the restoring force of the resilient foam pad 54 is reduced by the internal hysteresis of the resilient foam pad 54 which dissipates energy as the resilient foam pad 54 expands. The lower restoring force of the resilient foam pad 54 keeps the resilient foam pad 54 from adding energy to the rolling rail car body 23 and reduces acceleration of the rail car body 23 during a hunting event.

Thus, not only does the resilient foam pad 54 provide less of a restoring force due to the hysteresis within the resilient foam pad 54, but the frictional engagement between the wedges 50 and side walls 60A, 60B of the base 56 further slow the movement of the cap 32. In this manner, the side bearing 30 imparts a limited amount of energy to the rail car body as the side bearing 30 shifts from the compressed configuration of FIG. 6 back toward the setup configuration of FIG. 5.

Figure 8:
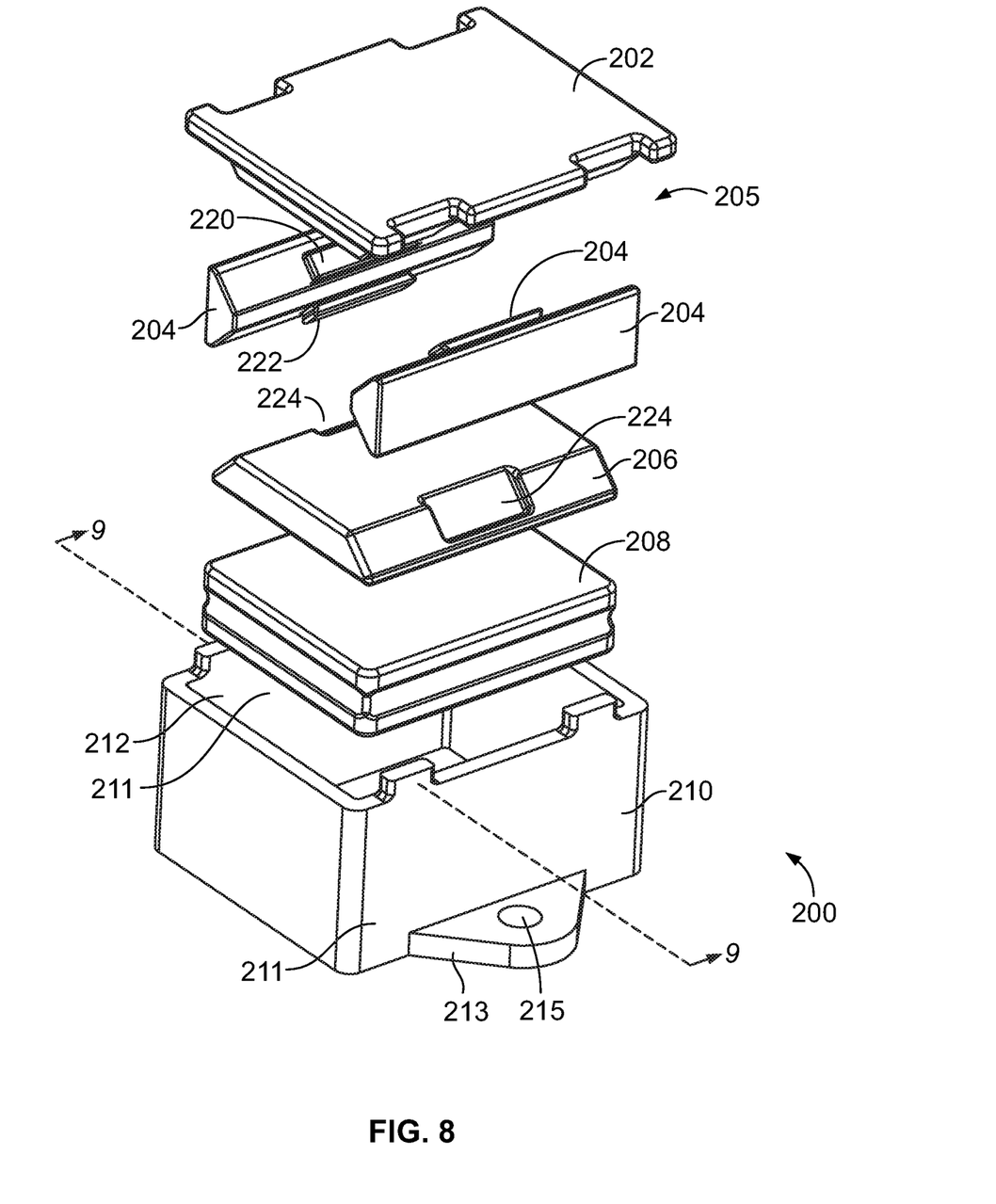
FIG. 8 is an exploded view of another side bearing showing wedges of the side bearing each having a pair of dovetail projections that are received in dovetail recesses of a cap and a wedge support of the side bearing.

With reference to FIG. 8, a side bearing 200 is provided that a similar in many respects to the side bearing 30 discussed above. The side bearing 200 includes a cap 202, wedges 204, a wedge support 206, a resilient foam pad 208, and a base 210. The base 210 includes a compartment 212 that receives at least a portion of the wedges 204, the wedge support 206, and the resilient foam pad 208. The side bearing 200 includes mating features 205 that retain the cap 202, the wedges 204, and the wedge support 206 in an assembled configuration and keep the cap 202 and wedges 204 from becoming disconnected from the wedge support 206. The mating features 205 may thereby improve handling of the side bearing 200 during installation of the side bearing 200 on a truck bolster.

Figure 9:
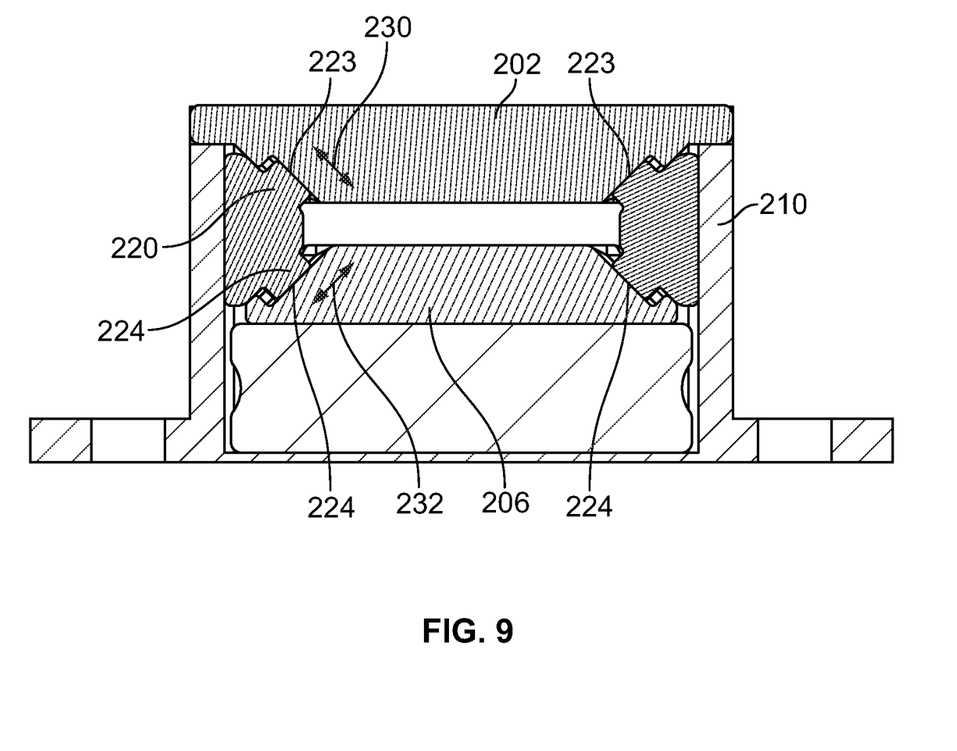
FIG. 9 is a cross-sectional view of the assembled side bearing of FIG. 8 taken across line 9-9 in FIG. 8.

With reference to FIG. 9, in one embodiment the mating features 205 include an upper dovetail projection 220 and a lower dovetail projection 222 of each of the wedges 204. The upper dovetail projection 220 slides in a dovetail recess 223 of the cap 202. The lower dovetail projection 222 is received in a dovetail recess 224 of the wedge support 206. The dovetail recesses 223 of the cap 202 and the dovetail recess 224 of the wedge support 206 are sized to permit the wedges 204 to shift relative to the cap 202 and the wedge support 206 in directions 230, 232. This movement accommodates horizontal movement of the wedges 204, while the engaged dovetail projections 220, 222 and the dovetail recesses 223, 224 keep the cap 202, wedges 204, and wedge support 206 assembled.

The base 210 has flanges 213 with openings 215 that receive bolts for securing the base 210 to a truck bolster. The openings 215 are aligned along the lateral direction of the railcar 25 when the side bearing 200 is mounted to the truck bolster. The cap 202 is longer in the longitudinal direction of the rail car 25 than the cap 202 is wide in the lateral direction of the rail car 25. By having the openings 215 aligned along the lateral direction, the shorter dimension of the cap 202 and is also oriented along the lateral direction. This permits opposite side walls 211 of the base 210 to be closer together and provides clearance for the bolts to be inserted into the openings 215. This permits the side walls 211 to be relatively flat rather than including features like protrusions 63 discussed above to provide clearance for the bolts.

Figure 10:
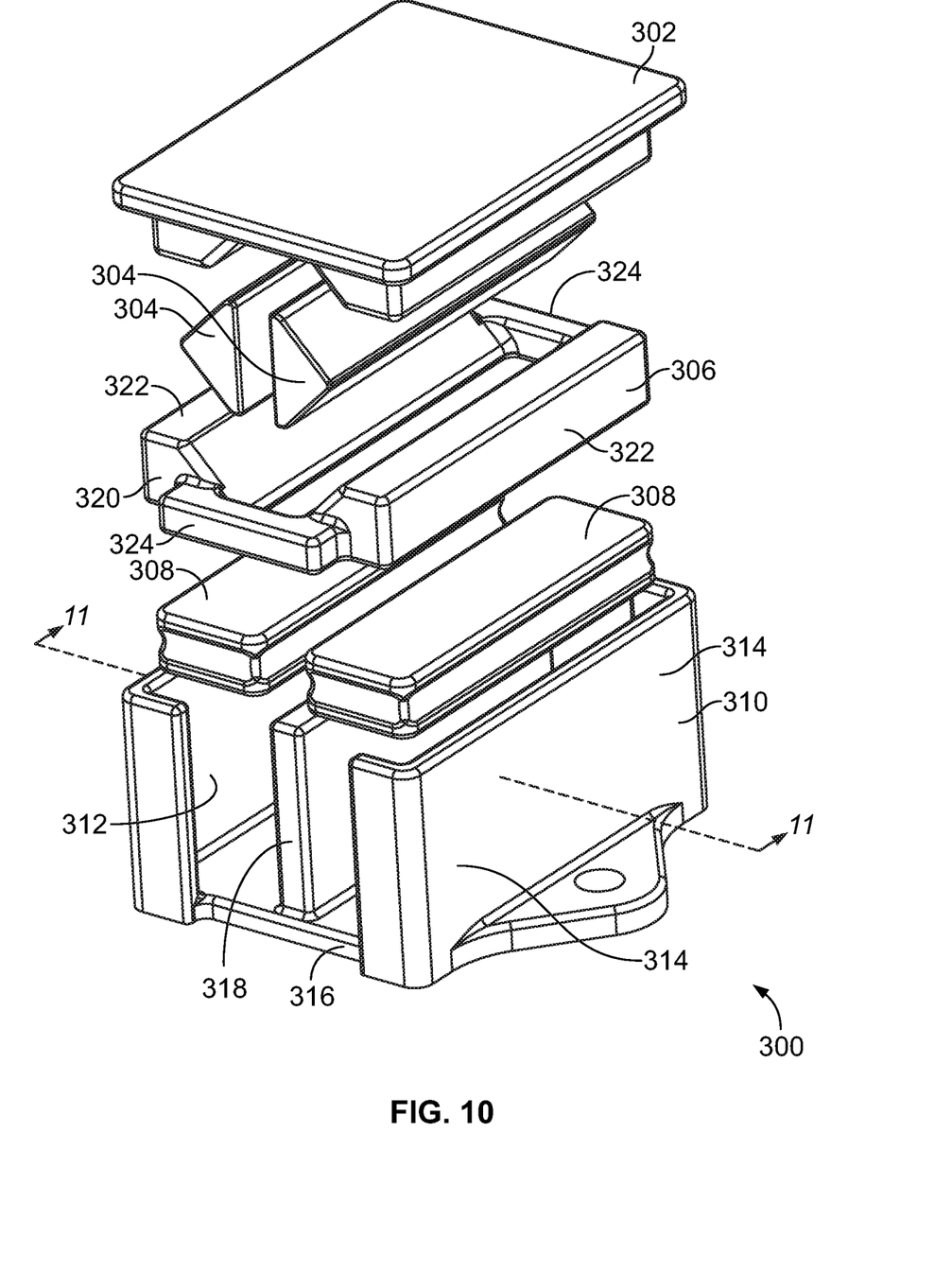
FIG. 10 is an exploded view of a side bearing having a base, two resilient foam pads, and wedges that engage a central wall of the base.

With reference to FIG. 10, a side bearing 300 is provided that a similar in many respects to the side bearings 30 and 200 discussed above. The side bearing 300 includes a cap 302, wedges 304, a wedge support 306, resilient foam pads 308, and a base 310. The base 310 includes a compartment 312 that receives at least portions of the cap 302, wedges 304, wedge support 306, and resilient foam pads 308. The compartment 312 includes side walls 314, a floor 316, and a center wall 318. One difference between the side bearing 300 and the side bearing 30 discussed above is that the wedges 304 are configured to be urged toward one another with compression of the side bearing 300 such that the wedges 304 engage the center wall 318 to create a drag force on the movement of the cap 302.

With reference to FIG. 10, the wedge support 306 includes a body 320 having halves 322 connected by links 324. The body halves 320 are received in the compartment 312 on opposite sides of the wall 318 and the links 324 extend around the walls 318 to connect the halves 322. The links 324 rigidly join the body halves 322 together and ensure the body halves 320 move together during reciprocal movement of the cap 302.

Figure 11:
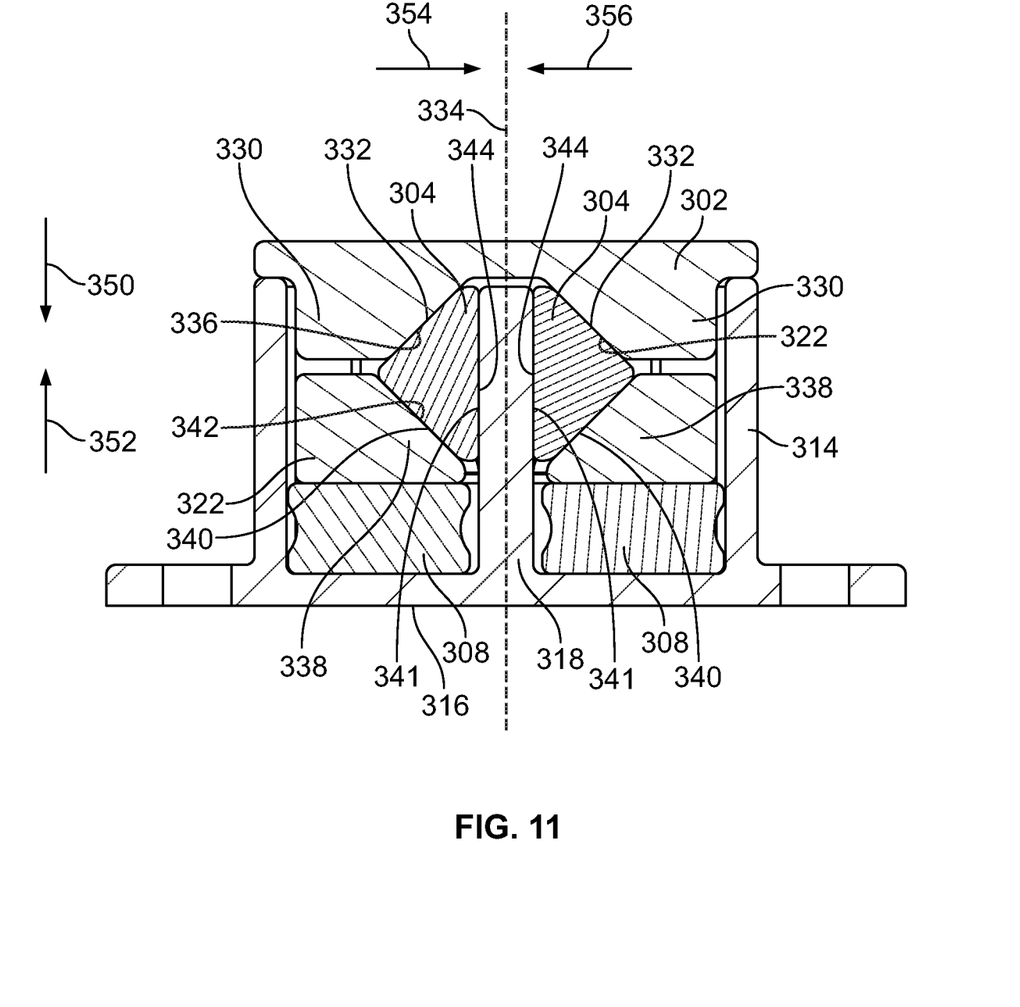
FIG. 11 is a cross-sectional view of the assembled side bearing of FIG. 10 taken across line 11-11 in FIG. 10.

Regarding FIG. 11, the cap 302 includes cam portions 330 each having a lower cam surface 332 that is inclined relative to a vertical axis 334 of the side bearing 300. Each cam surface 332 is engaged with an upper surface 336 of one of the wedges 304. The body halves 322 each include a cam portion 338 having an upper cam surface 340 engaged with a lower cam surface 342 of one of the wedges 304. The wedges 304 each include a surface 341 facing one of the opposing surfaces 344 of the center wall 318. The center wall 318 has wall portions on opposite sides of the center wall 318 that include the surfaces 344.

Thus, when the railcar body 23 applies a compressive force in direction 350 against the cap 302, the resilient foam pads 308 apply a reaction force in direction 352. These forces acting in directions 350, 352 clamp the wedges 304 between the cap 302 and the halves 322 of the wedge support 306. Due to the engaged surfaces 332, 336 and 340, 342, this clamping action urges the wedges 304 together in directions 354, 356. Frictional engagement caused by the contact between the wedges 304 and the center wall 318 dampens movement of the cap 302 in a manner similar to the wedges 50 discussed above. By centrally locating the wedges 304, the wedges 304 apply substantially equal and opposite horizontal forces against the center wall 318 even if the cap 302 tilts slightly relative to the vertical axis 334 during movement of the cap 302. Further, the equal and opposite horizontal forces the wedges 304 apply against the center wall 318 cause the wedges 304 to operate in unison which dampens more efficiently and contributes to an overall more stable railcar body 23.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, the side bearing 30 may be utilized with freight rail cars and passenger rail cars as some examples.

What is claimed is:

1. A side bearing for supporting a body of a rail car, the side bearing comprising:
   a base for being mounted to a truck of the rail car;
   a support configured to contact the body of the rail car and move along a vertical axis relative to the base with movement of the body;
   at least one resilient foam member including a matrix of elastomeric material and air pockets therein, the at least one resilient foam member configured to deform with movement of the support;
   at least one friction damping member configured to be urged in a direction transverse to the vertical axis against the base by the support and resist movement of the support relative to the base;
   wherein the at least one resilient foam member imparts a reactionary force in response to deformation of the at least one resilient foam member from an initial configuration to a compressed configuration caused by movement of the support toward the base with rolling of the rail car body toward the side bearing, the deformation of the at least one resilient foam member from the initial configuration to the compressed configuration decreasing the size of the air pockets of the resilient foam member;
   wherein the at least one resilient foam member imparts a restoring force in response to the at least one resilient foam member returning from the compressed configuration to a less compressed configuration caused by movement of the support away from the base with rolling of the rail car body away from the side bearing, the returning of the at least one resilient foam member from the compressed configuration to the less compressed configuration increasing the size of the air pockets; and
   wherein the matrix of elastomeric material of the at least one resilient foam member provides internal hysteresis damping such that the restoring force is less than the reactionary force to limit the energy the at least one resilient foam member imparts to the rolling rail car body.

2. The side bearing of claim 1 wherein the support and the at least one friction damping member include a pair of engaged surfaces extending obliquely to the vertical axis.

3. The side bearing of claim 1 wherein the at least one friction damping member includes a pair of friction damping members that are configured to be urged in opposite directions against the base by the support.

4. The side bearing of claim 1 wherein the base includes at least one flat wall adjacent the resilient foam member and the at least one friction damping member is configured to slide along the at least one flat wall.

5. The side bearing of claim 1 wherein the at least one resilient foam member comprises microcellular urethane.

6. The side bearing of claim 1 wherein the at least one resilient foam member has a volume and the air pockets constitute approximately 30 percent to approximately 50 percent of the volume of the at least one resilient foam member.

7. The side bearing of claim 1 wherein the at least one resilient foam member has an open cell configuration that permits air to travel out of the air pockets as the resilient foam member deforms from the initial configuration to the compressed configuration.

8. A side bearing for supporting a body of a rail car, the side bearing comprising:
   a base for being mounted to a truck of the rail car;
   a support configured to contact the body of the rail car and move along a vertical axis relative to the base with movement of the body;
   at least one resilient foam member configured to deform with movement of the support;
   at least one friction damping member configured to be urged in a direction transverse to the vertical axis against the base by the support and resist movement of the support relative to the base; and
   a damping body intermediate the support and the at least one resilient foam member, the damping body configured to urge the at least one friction damping member in the direction transverse to the vertical axis against the base.

9. The side bearing of claim 8 wherein the support is movable along the vertical axis between upper and lower positions and the at least one friction damping member and the damping body include a first pair of engaged surfaces extending obliquely to the vertical axis.

10. The side bearing of claim 9 wherein the support and the at least one friction damping member include a second pair of engaged surfaces extending obliquely to the vertical axis.

11. A side bearing for supporting a body of a rail car, the side bearing comprising:
a base for being mounted to a truck of the rail car;
a support configured to contact the body of the rail car and move along a vertical axis relative to the base with movement of the body;
at least one resilient foam member configured to deform with movement of the support;
at least one friction damping member configured to be urged in a direction transverse to the vertical axis against the base by the support and resist movement of the support relative to the base; and
wherein the at least one resilient foam member includes a pair of resilient foam members.

12. The side bearing of claim 11 wherein the base includes a center wall intermediate the pair of resilient foam members.

13. A side bearing for supporting a body of a rail car, the side bearing comprising:
a base for being mounted to a truck of the rail car;
a support configured to contact the body of the rail car and move along a vertical axis relative to the base with movement of the body;
at least one resilient foam member configured to deform with movement of the support;
at least one friction damping member configured to be urged in a direction transverse to the vertical axis against the base by the support and resist movement of the support relative to the base; and
wherein the at least one resilient foam member has an unloaded height and the at least one resilient foam member is resiliently compressible to at least seventy percent of the unloaded height.

14. A rail car comprising:
a rail car body;
a pair of trucks supporting the rail car body;
a pair of side bearings of each truck on opposite sides of the rail car body, each side bearing including:
a base;
a support configured to contact the rail car body and move along a vertical axis relative to the base with movement of the rail car body relative to the truck;
at least one resilient foam member arranged to deform with movement of the support;
at least one friction damping member configured to be urged in a direction transverse to the vertical axis against the base by the support and resist movement of the support relative to the base; and
wherein each side bearing includes a damping body intermediate the support and the at least one resilient foam member, the damping body configured to urge the at least one friction damping member in the direction transverse to the vertical axis against the base.

15. The rail car of claim 14 wherein the support and the at least one friction damping member include a pair of engaged surfaces extending obliquely to the vertical axis of the support.

16. The rail car of claim 14 wherein the at least one friction damping member and the damping body include a first pair of engaged surfaces extending obliquely to the vertical axis.

17. The rail car of claim 14 wherein the at least one friction damping member includes a pair of friction damping members that slide along the base and resist movement of the support relative to the base.

18. The rail car of claim 14 wherein the base includes at least one flat wall and the at least one friction damping member is configured to slide along the at least one flat wall.

19. A rail car of claim 14 comprising:
a rail car body;
a pair of trucks supporting the rail car body;
a pair of side bearings of each truck on opposite sides of the rail car body, each side bearing including:
a base;
a support configured to contact the rail car body and move along a vertical axis relative to the base with movement of the rail car body relative to the truck;
at least one resilient foam member arranged to deform with movement of the support;
at least one friction damping member configured to be urged in a direction transverse to the vertical axis against the base by the support and resist movement of the support relative to the base; and
wherein the side bearings each include a hard stop that limits rolling movement of the rail car body to a predetermined range of motion and the resilient foam members of the side bearings are configured to keep the supports of the side bearings in contact with the rail car body throughout the range of motion of the rail car body.

20. The rail car of claim 19 wherein the hard stop includes surfaces of the support and the base extending transverse to the vertical axis.

21. The rail car of claim 19 wherein the base includes walls with the at least one foam member between the walls; and
wherein the hard stop includes portions of the walls and portions of the support.

22. A side bearing for supporting a body of a rail car, the side bearing comprising:
a base for being mounted to a truck of the rail car;
a compartment of the base;
at least one resilient member in the compartment;
a pair of wall portions of the compartment;
a cap assembly supported on the at least one resilient member and configured to move relative to the base with movement of the body of the rail car;
a pair of friction damping members of the cap assembly facing the wall portions of the compartment of the base;
a cap of the cap assembly having an upper surface for contacting the body of the rail car and at least one lower surface configured to contact the friction damping members and urge the friction damping members in opposite directions against the wall portions to dampen movement of the cap assembly; and
wherein the at least one lower surface of the cap includes a pair of inclined surfaces and the friction damping members each include an inclined surface engaged with one of the inclined surfaces of the cap.

23. The side bearing of claim 22 wherein the cap assembly includes a damping body and the friction damping members are sandwiched between the cap and the damping body.

24. A side bearing for supporting a body of a rail car, the side bearing comprising:
a base for being mounted to a truck of the rail car;
a compartment of the base;
at least one resilient member in the compartment;
a pair of wall portions of the compartment;

a cap assembly supported on the at least one resilient member and configured to move relative to the base with movement of the body of the rail car;

a pair of friction damping members of the cap assembly facing the wall portions of the compartment of the base;

a cap of the cap assembly having an upper surface for contacting the body of the rail car and at least one lower surface configured to contact the friction damping members and urge the friction damping members in opposite directions against the wall portions to dampen movement of the cap assembly; and wherein the at least one lower surface of the cap is configured to contact the friction damping members and urge the friction damping members toward each other in opposite directions against the wall portions.

25. The side bearing of claim 24 wherein the base comprises a center wall that includes the wall portions thereon.

26. The side bearing of claim 24 wherein the wall portions, the friction damping members, or both the wall portions and friction damping members include a coating.

27. The side bearing of claim 24 wherein the at least one resilient member includes a pair of resilient members; and wherein the base includes a wall intermediate the resilient members.

28. The side bearing of claim 27 wherein the cap body includes a damping body, the friction damping members sandwiched between the cap and the damping body; and wherein the damping body includes a central opening and the wall of the base extends in the opening of the damping body.

29. The side bearing of claim 24 wherein the cap assembly includes a damping body, the friction damping members intermediate the cap and the damping body; and wherein the friction damping members have lower surfaces and the damping body includes upper surfaces configured to contact the lower surfaces of the friction damping members and urge the friction damping members toward each other in the opposite directions against the wall portions.

* * * * *

UNITED STATES PATENT AND TRADEMARK OFFICE
CERTIFICATE OF CORRECTION

| | | |
|---|---|---|
| PATENT NO. | : 11,091,179 B2 | Page 1 of 1 |
| APPLICATION NO. | : 16/178232 | |
| DATED | : August 17, 2021 | |
| INVENTOR(S) | : Zachary B. Harris | |

It is certified that error appears in the above-identified patent and that said Letters Patent is hereby corrected as shown below:

In the Claims

Column 14, Line 8, in the preamble of Claim 19, delete "of claim 14".

Signed and Sealed this
Thirtieth Day of January, 2024

Katherine Kelly Vidal
*Director of the United States Patent and Trademark Office*